United States Patent [19]
Mann

[11] Patent Number: 5,139,545
[45] Date of Patent: Aug. 18, 1992

[54] AIR INTAKES FOR GAS TURBINE ENGINES

[75] Inventor: Darrell L. Mann, Luton, England

[73] Assignee: Rolls-Royce plc, London, England

[21] Appl. No.: 760,911

[22] Filed: Sep. 17, 1991

[30] Foreign Application Priority Data

Sep. 25, 1990 [GB] United Kingdom ............... 9020840

[51] Int. Cl.5 ............................................. B01D 45/12
[52] U.S. Cl. .................................... 55/306; 60/39.092
[58] Field of Search ........................ 60/39.092; 55/306

[56] References Cited

U.S. PATENT DOCUMENTS

| | | | |
|---|---|---|---|
| 3,521,431 | 7/1970 | Connors et al. | 55/306 |
| 3,832,086 | 8/1974 | Hull et al. | 55/306 |
| 4,509,962 | 4/1985 | Breitman et al. | 60/39.092 |
| 4,592,765 | 6/1986 | Breitman et al. | 55/306 |
| 4,617,028 | 10/1986 | Ray et al. | 55/306 |
| 4,881,367 | 11/1989 | Flatman | 60/39.092 |

Primary Examiner—Bernard Nozick
Attorney, Agent, or Firm—Oliff & Berridge

[57] ABSTRACT

An inlet particle separator for a gas tubine engine, comprises, (a) an annular air inlet duct, (b) downstream of the inlet duct an annular obturating member having a continuous surface, the menber arranged to bifurcate the inlet duct into annular compressor and scavenge ducts, the compressor duct leading downstream to an engine compressor stage, the scavenge duct being located radially inwardly of the compresor duct and directed upstream thereof, and arranged to scavenge solid matter from the air flow through the inlet duct. The inlet duct is provided with an annular constriction at its downstream end extending radially inwards from a radially outer wall of the inlet duct. The inlet duct is angled so as to direct incoming air against the obturating member, the arrangement of the obturating member, the inlet duct, and the constriction being such as to prevent line-of-sight viewing of the compressor duct from the inlet duct and to deflect solid matter colliding with the walls of the inlet duct into the scavenge duct.

4 Claims, 4 Drawing Sheets

AIR INTAKES FOR GAS TURBINE ENGINES

FIELD OF THE INVENTION

This invention relates to improvements in or relating to air intakes for gas turbine engines, and in particular relates to an air intake particle separator for an aircraft turbine engine.

It is known to use inlet particle separators in aircraft turbine engines to remove, or scavenge, foreign bodies from the engine air inlet path and to eject them from the air inlet in such a manner that they do not enter the compressor or subsequent stages of the engine, thereby avoiding damage to the engine. The foreign bodies may be a variety of objects ranging from dust, hail, and gravel, to birds. Birds, in particular, are difficult to scavenge due to their low density and high drag.

Gas turbine engines used in helicopters are particularly susceptible to foreign body ingestion because of the frequent proximity of the aircraft to the ground and loose matter on the ground being blown into the engine air intake by rotating helicopter blades. Turbine engines in fixed wing aircraft are also liable to damage from foreign bodies thrown up from the ground when the aircraft is taxiing, landing, or taking off, as well as ingestion of hail and birds when the aircraft is in flight.

DESCRIPTION OF THE PRIOR ART

It will be convenient to discuss certain particle separator systems of the prior art as follows.

One such known particle separator is shown in schematic FIGS. 1 and 2 of the accompanying drawings, in which, FIG. 1 is a longitudinal section through a portion of an annular air intake to an aircraft turbine engine (not shown), and FIG. 2 is an annular section taken on the line A—A in FIG. 1.

In FIG. 1 there is shown the longitudinal center line 10 of the engine and an annular air inlet passage 12 leading to and bifurcating into an annular scavenge passage 14 and an annular engine compressor air passage 16, the engine compressor air passage being located radially inward of the scavenge passage.

In FIG. 2 there is shown in addition to the annular scavenge passage 14 a downstream exit pipe 18 into which the scavenged air from the passage 14 flows. The airflow is indicated by arrows 7 in FIGS. 1 and 2.

It will be seen that the entrance to the scavenge passage 14 is at a greater radius than the entrance to the compressor passage 16. Accordingly, the sectional area of the scavenge passage 14 will tend to be greater than that of the compressor passage. This is not compatible with the intention that the scavenge air flow be substantially less than the engine flow, and will therefore result in poor flow distributions and large and separated and stagnant regions, as shown in the hatched region 20 in FIG. 1. This is not only undesirable from the point of view of dust separation efficiency and pressure losses, but the need to collect the scavenge annulus into the single (or possibly double) exit pipe 18 will inevitably result in the three dimensional flows illustrated in FIG. 2, where here again is shown the stagnant region 20. This factor further complicates the design process and makes it virtually impossible to maintain axi-symmetry of the system.

Furthermore, the necessarily large radius of the scavenge system compared with the compressor passage 16 leads to undesirably high weight and high internal surface area. It is also desirable to reduce the surface area of the scavenge system in order to minimize anti-icing heating requirements.

Another scavenging system of the prior art is shown in schematic form in FIG. 3 which depicts a longitudinal section through a portion of an annular air intake to a helicopter turbine engine (not shown).

In the system of FIG. 3 there is shown an annular air inlet 22 directing air to an annular compressor passage 24 and an initial annular scavenging passage 26 leading to an exit scavenging passage 36 on the engine center line 21. The compressor passage 24 is at a greater radius than the scavenge passage 26, and this system therefore overcomes the first disadvantage of the system of FIG. 1 and will thus ensure that the scavenge air flow is less than the compressor air flow. The airflow is indicated by arrows 8. The system of FIG. 3 relies on the presence of several air paths (28, 30, 32, 34) into the compressor passage 24, and hence depends on incoming particles being successfully directed into the initial scavenge passage 26 and finally into the exit scavenge passage 36 through numerous impacts on the splitter regions 38 between the several air paths. A typical path is trajectory T1. However, since particle bounce is a random effect, the system of FIG. 3 will always be susceptible to instances (e.g. trajectory T2) where a particle bounces off the wall of the scavenge passage 26, through one of the air paths 28 - 34, and into the compressor passage 24. Furthermore, an example trajectory T4 will enable a foreign body to enter the compressor passage 24, which clearly is undesirable.

The arrangement of the flow splitting air paths 28 - 34 in the system of FIG. 3 produces a separating mechanism by gradually reducing the radius of the scavenge passage 26. Clearly, this system could not scavenge large foreign bodies such as birds from the engine air intake.

It is an object of the present invention to provide an air intake scavenging system for a gas turbine engine which overcomes the disadvantages of the known systems described above with reference to FIGS. 1 to 3.

The term "annular" used in this specification as a qualifier of a feature of the invention is to be understood to mean with respect to the longitudinal axis of the engine as the center of the respective annular feature, unless otherwise indicated. The term "radial" used in this specification is to be understood to mean a direction at right angles to the longitudinal axis of the engine, unless otherwise indicated.

SUMMARY OF THE INVENTION

According to the present invention there is provided an inlet particle separator for a gas turbine engine, the separator comprising: (a) an annular air inlet duct, (b) downstream of the inlet duct an annular obturating member having a continuous surface, the member arranged to bifurcate the inlet duct into first and second annular ducts, the first annular duct leading downstream to an engine compressor stage, the second annular duct being located radially inwardly of the first annular duct and directed upstream thereof, and arranged to scavenge solid matter from the air flow through the inlet duct, wherein the inlet duct is provided with an annular constriction at its downstream end, the constriction extending radially inwards from a radially outer wall of the inlet duct, the inlet duct further being angled so as to direct incoming air against the obturating member, the arrangement of the obturating member, the inlet duct, and the constriction being such as to prevent line-of-sight viewing of the first annular duct from the inlet duct and to deflect solid matter colliding with the walls of the inlet duct into the second annular duct.

Preferably, the obturating member is positioned at an acute angle relative to the longitudinal axis of the engine in a direction towards the air inlet end of the engine.

Preferably, the radial distance of the annular periphery of the obturating member from the longitudinal axis of the engine is at least equal to the minimum axial distance of the annular constriction from the engine longitudinal axis.

Preferably, the second annular duct is provided with a restriction at its inlet.

BRIEF DESCRIPTION OF THE DRAWINGS

Referring now to the drawings which form part of this original disclosure:

FIGS. 1-3 describe by way of example certain particle separator systems of the prior art, in which, FIG. 1 is a longitudinal section through a portion of an annular air intake to an aircraft turbine engine (not shown), FIG. 2 is an annular section taken on the line A-A in FIG. 1, and FIG. 3 is a longitudinal section through a portion of an annular intake to a helicopter turbine engine (not shown).

The invention will now be described by way of example only with reference to non-scale schematic FIGS. 4 - 6 of the accompanying drawings, in which.

DESCRIPTION OF THE PREFERRED EMBODIMENTS

Figure 4:
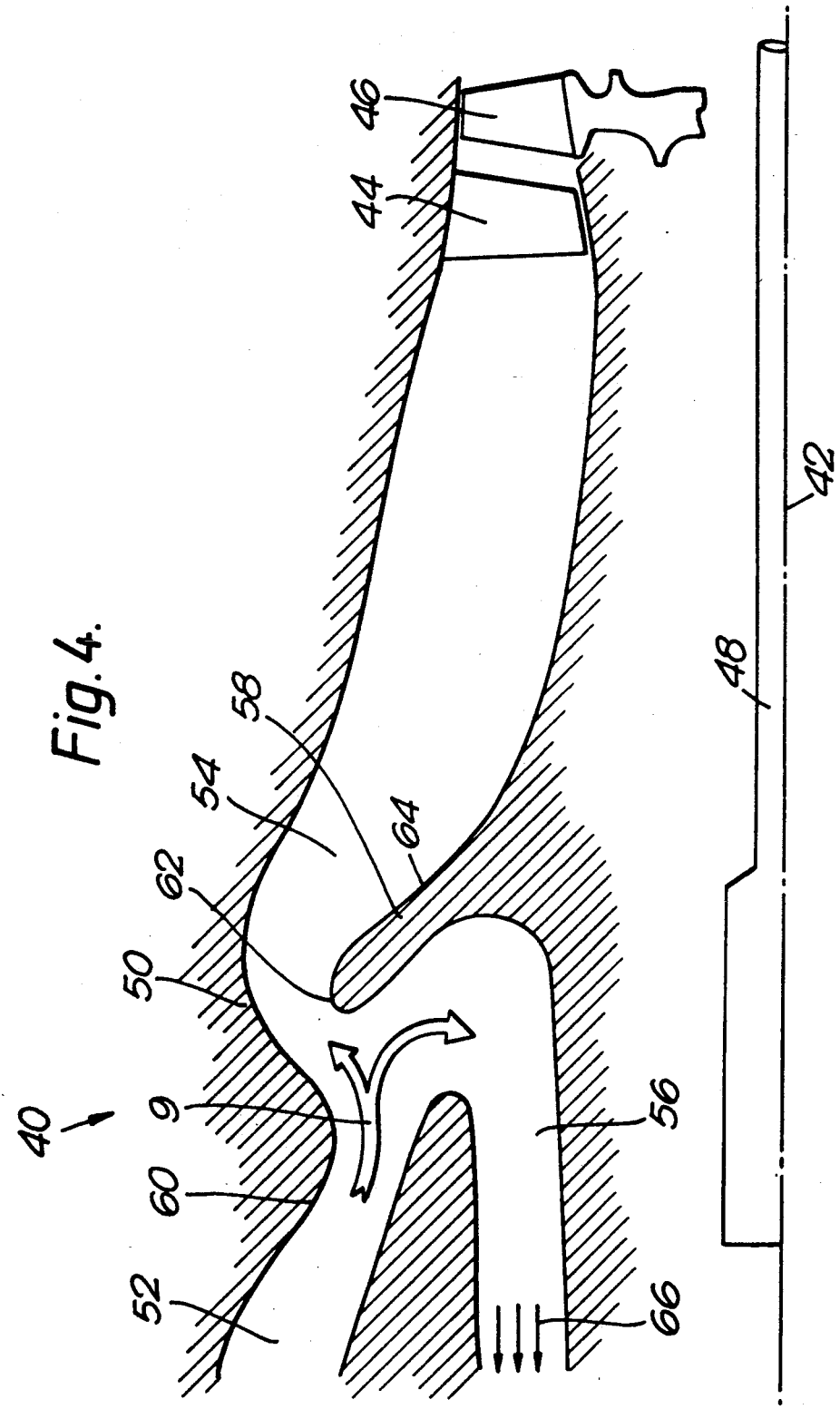
FIG. 4 is a longitudinal section through part of the front portion of a gas turbine engine, showing an inlet particle separator and, in simplified outline, part of a compressor section of the engine.

Referring to FIG. 4 there is shown in longitudinal section the top half of part of the front end of a gas turbine engine 40. The longitudinal axis of the engine is indicated by chain line 42. The engine is provided with a compressor section having guide vanes 44 and rotors 46, and, downstream of the compressor section and not illustrated, the usual combustion chamber, turbine section, and exit nozzle. A longitudinal drive shaft is indicated in outline at 48.

Figure 3:
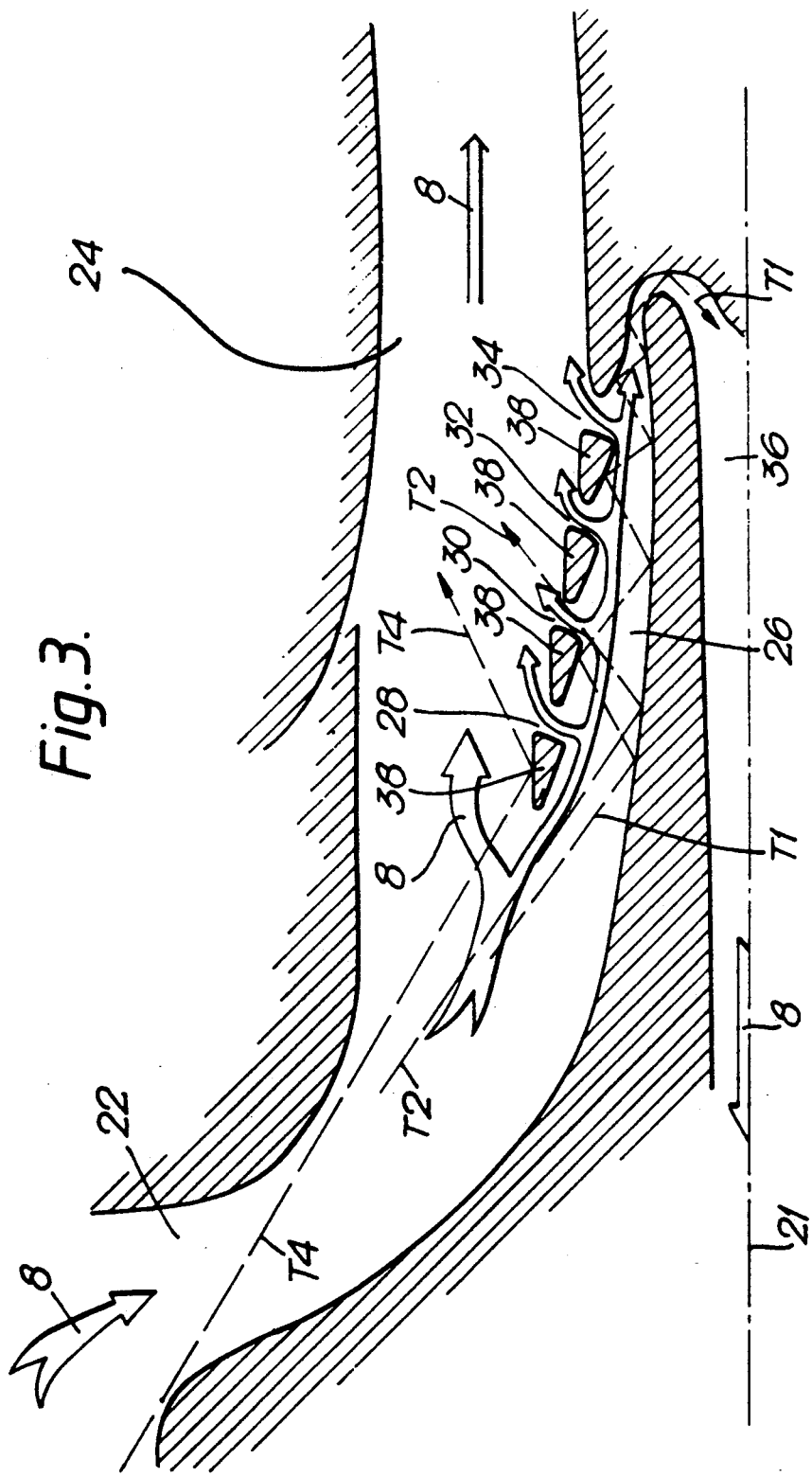

Upstream of the compressor section there is shown, in section, an inlet particle separator 50 comprising an annular inlet duct 52, an annular first or compressor duct 54, an annular second or scavenge duct 56, and an annular obturator 58 positioned so as to bifurcate the air flow from the inlet duct into the compressor and scavenge ducts. The obturator is an annular web of integral construction, extending radially outwards, with a substantially continuous surface (i.e. no apertures, save those which may be necessary for anti-icing purposes), thus partially obstructing the air flow from the inlet duct, and, unlike the prior art embodiment of FIG. 3, does not use air paths from the scavenge duct 56 into the compressor duct 54.

As shown by arrows 9 the inlet duct 52 directs intake air in a generally radially inward direction towards the obturator 58. The compressor duct 54 directs intake air downstream from the obturator 58 towards the compressor section of the engine, and the scavenge duct 56 directs scavenged air upstream from the obturator in a direction generally parallel to the longitudinal axis of the engine and radially inwardly of the compressor duct 54 to an extractor scroll which will be described infra with reference to FIGS. 5 and 6.

The downstream end of the inlet duct 52 is provided on its radially outer portion with a radially inwardly extending lip 60 which constricts the downstream exit from the duct and assists in directing entrained solids radially inward.

The obturator 58 is positioned at an acute angle with respect to the longitudinal axis of the engine, pointing in a direction towards the air inlet end. The effect generally is that intake air coming through the inlet duct 52 strikes the obturator 58, clean air is directed over a peripheral lip 62 of the obturator into the compressor duct 54, while "dirty" air — that is, air containing solid particles or larger objects — takes a path on the upstream side of the obturator into the scavenge duct 56. Since the scavenge duct 56 is radially inward of the compressor duct 54 it is inherently a lower area region of the system, and this ensures that scavenge system velocities are maintained at a high level (possibly higher than those within the compressor side of the bifurcation). This will lead to much reduced pressure losses and will aid particle separation efficiency.

The peripheral lip 62 of the obturator 58 is thicker than the radially inner neck 64 of the obturator so as to provide a constriction to the entrance to the scavenge duct and to provide a slightly concave upstream surface of the obturator, again assisting particle separation. The lip 62 of the obturator is also radially at least as far from the longitudinal axis 42 of the engine as is the inlet duct lip 60. This ensures that there is no line-of-sight from the inlet duct 52 into the compressor duct 54, thus rendering it virtually impossible for solid objects to pass directly from the inlet duct to the compressor duct. The inlet duct lip also ensures that particles bouncing around inside the inlet duct will be directed inevitably against the upstream face of the obturator radially inward of the obturator lip 62, and into the scavenge duct 56. The "dirty" air containing scavenged particles leaves the scavenge duct 56 in an upstream direction, as shown by arrows 66.

In an alternative embodiment, not shown, the obturator lip 62 need not be thicker than the radially inner neck of the obturator.

Figure 5:
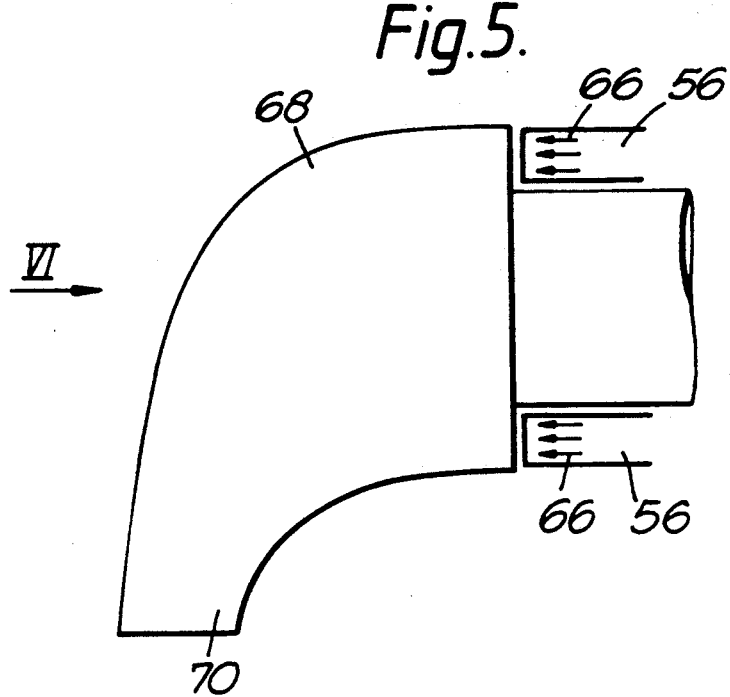
FIG. 5 is a side view of an extractor scroll arrangement to direct scavenged matter out of the engine.
Figure 6:
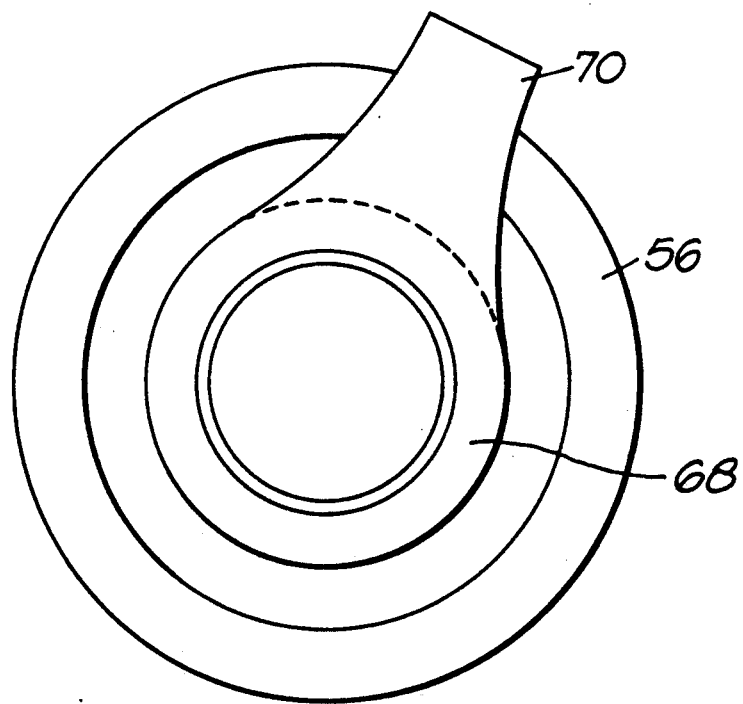
FIG. 6 is a view of the extractor scroll arrangement of FIG. 5 taken in the direction of arrow VI.

As shown in FIGS. 5 and 6, scavenged air (arrows 66) leaves the annular scavenge duct 56 and enters an extractor scroll 68 whereby it is diverted radially of the longitudinal engine axis 42 across the compressor inlet flow path and exits the aircraft through a radial exit duct 70.

Figure 1:
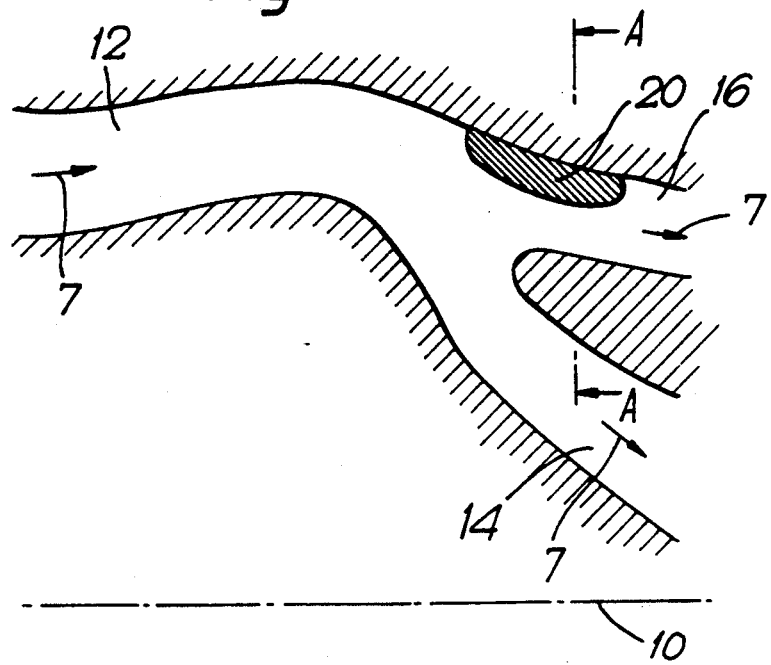
Figure 2:
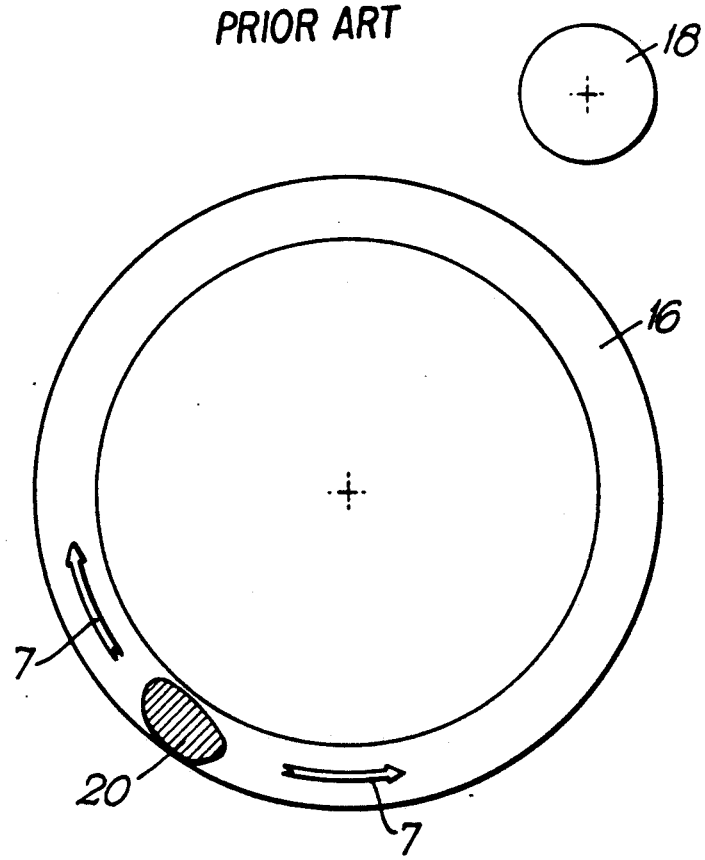

The present invention provides a dust extraction efficiency better than that of, for instance, the prior art embodiment of FIG. 1 and provides about 50% reduction in scroll pressure loss. Furthermore, because the scavenging ducting is taken inside the engine intake ductwork, there is a reduction in weight of the scavenging ducting of about 40% and a 60% reduction in its internal surface area. The scavenging ducting of the present invention is also able to facilitate the separation of birds and other large foreign objects.

I claim:

1. An inlet particle separator for a gas turbine engine, the separator comprising: (a) an annular air inlet duct, (b) downstream of the inlet duct and extending radially outwards from the engine axis an annular web-form obturating member having a continuous surface, the member arranged to bifurcate the inlet duct into first and second annular ducts, the first annular duct leading downstream to an engine compressor stage, the second annular duct being located radially inwardly of the first annular duct and directed upstream thereof, and arranged to scavenge solid matter from the air flow through the inlet duct, wherein the inlet duct is provided with an annular constriction at its downstream end, the constriction extending radially inwards from a radially outer wall of the inlet duct, the inlet duct further being angled so as to direct incoming air against the obturating member, the arrangement of the obturating member, the inlet duct, and the constriction being such as to prevent line-of-sight viewing of the first annular duct from the inlet duct and to deflect solid matter colliding with the walls of the inlet duct into the second annular duct.

2. An inlet particle separator as claimed in claim 1 wherein the obturating member is positioned at an acute angle relative to the longitudinal axis of the engine in a direction towards the air inlet end of the engine.

3. An inlet particle separator as claimed in claim 1 wherein the radial distance of the annular periphery of the obturating member from the longitudinal axis of the engine is at least equal to the minimum axial distance of the annular constriction from the engine longitudinal axis.

4. An inlet particle separator as claimed in claim 1 wherein the second annular duct is provided with a restriction at its inlet.

* * * * *